Jan. 5, 1954            A. C. MAYO            2,664,800
PHOTOGRAPHIC CAMERA AND SHUTTER MECHANISM THEREFOR
Filed Sept. 25, 1950            6 Sheets-Sheet 1
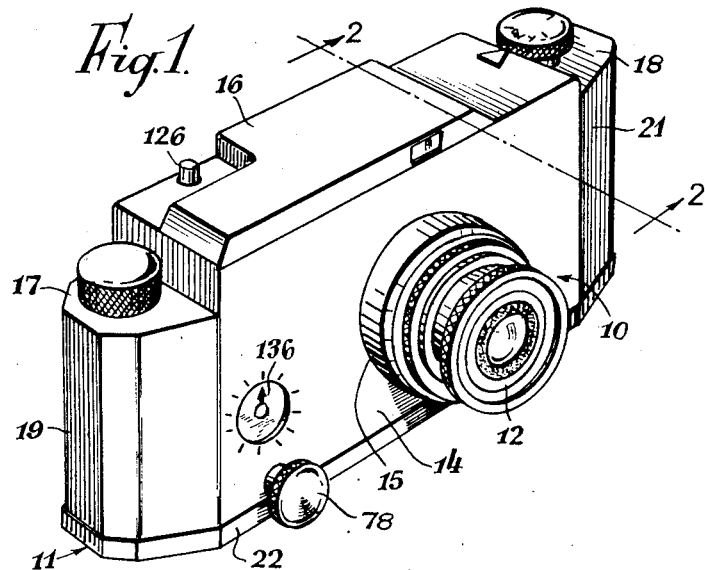
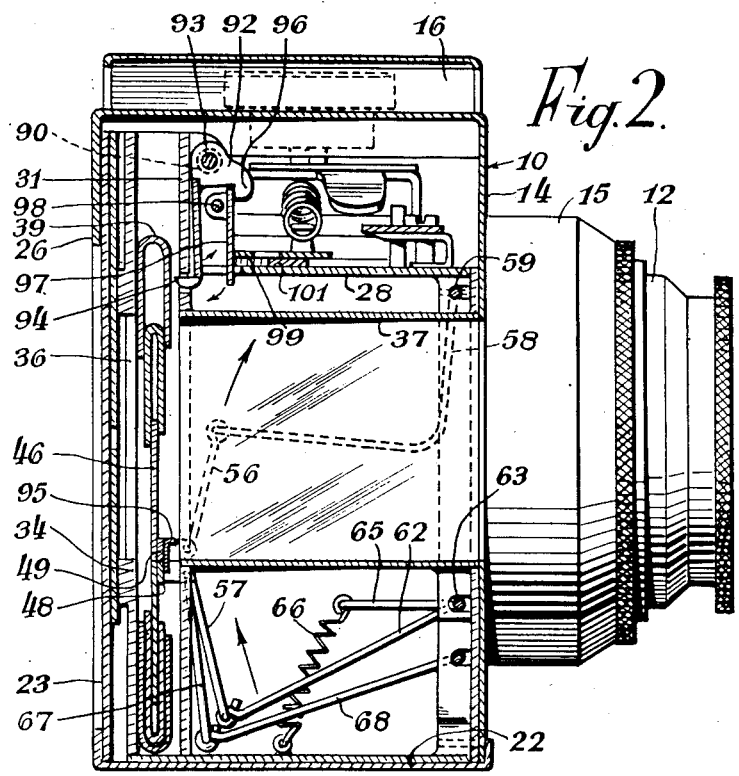
INVENTOR
Alfred Croger Mayo
BY Stevens, Davis, Miller & Mosher
his ATTORNEYS Jan. 5, 1954     A. C. MAYO     2,664,800
PHOTOGRAPHIC CAMERA AND SHUTTER MECHANISM THEREFOR
Filed Sept. 25, 1950     6 Sheets-Sheet 2

INVENTOR
Alfred Croger Mayo
BY
Stevens, Davis, Miller & Mosher
ATTORNEY

Jan. 5, 1954            A. C. MAYO            2,664,800
PHOTOGRAPHIC CAMERA AND SHUTTER MECHANISM THEREFOR
Filed Sept. 25, 1950            6 Sheets-Sheet 3
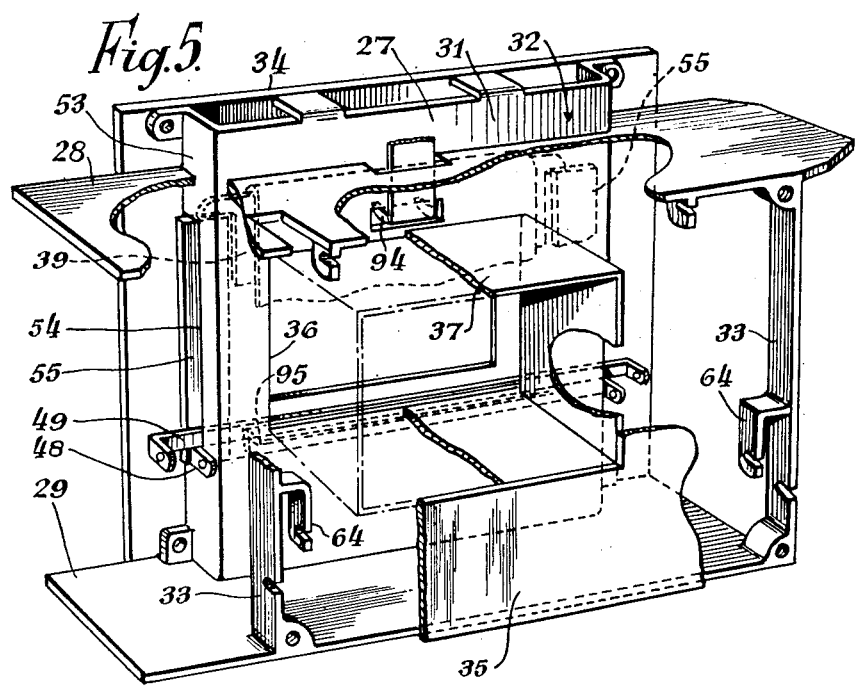
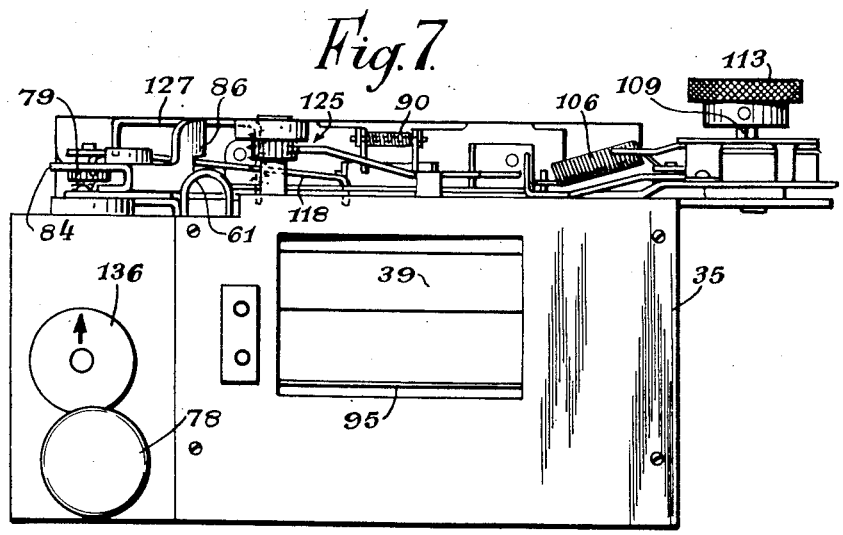
INVENTOR
Alfred Croger Mayo
BY Stevens, Davis, Miller & Mosher
his ATTORNEYS Jan. 5, 1954 A. C. MAYO 2,664,800
PHOTOGRAPHIC CAMERA AND SHUTTER MECHANISM THEREFOR
Filed Sept. 25, 1950 6 Sheets-Sheet 4
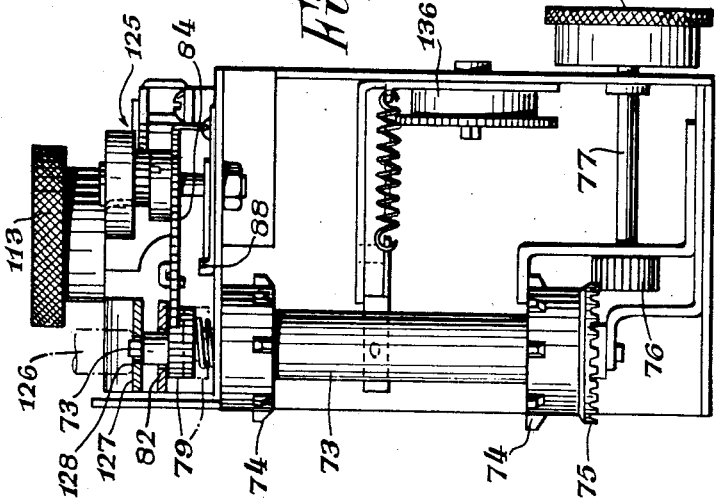
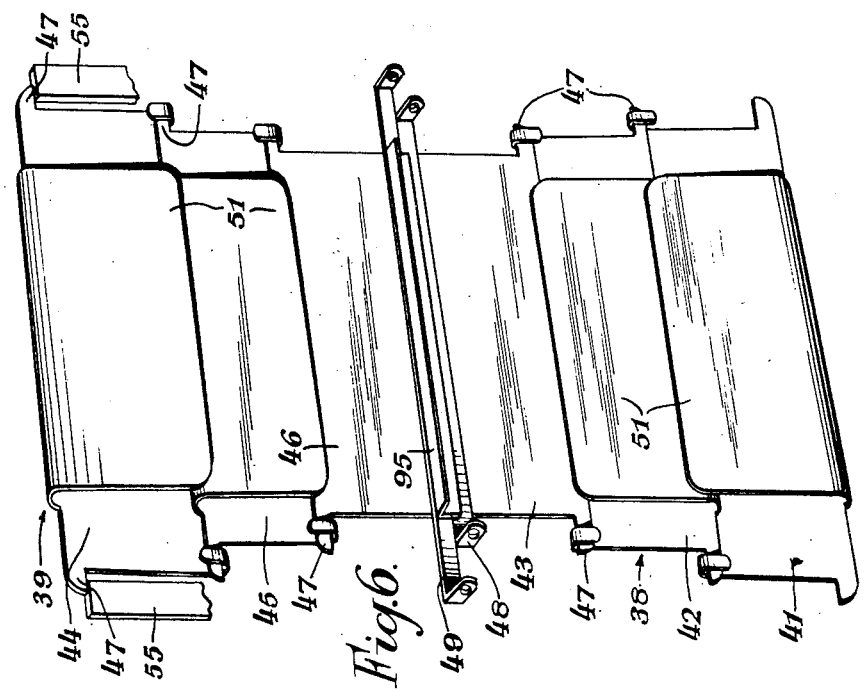
INVENTOR
Alfred Crozier Mayo
BY
Stevens, Davis, Miller + Mosher
ATTORNEYS

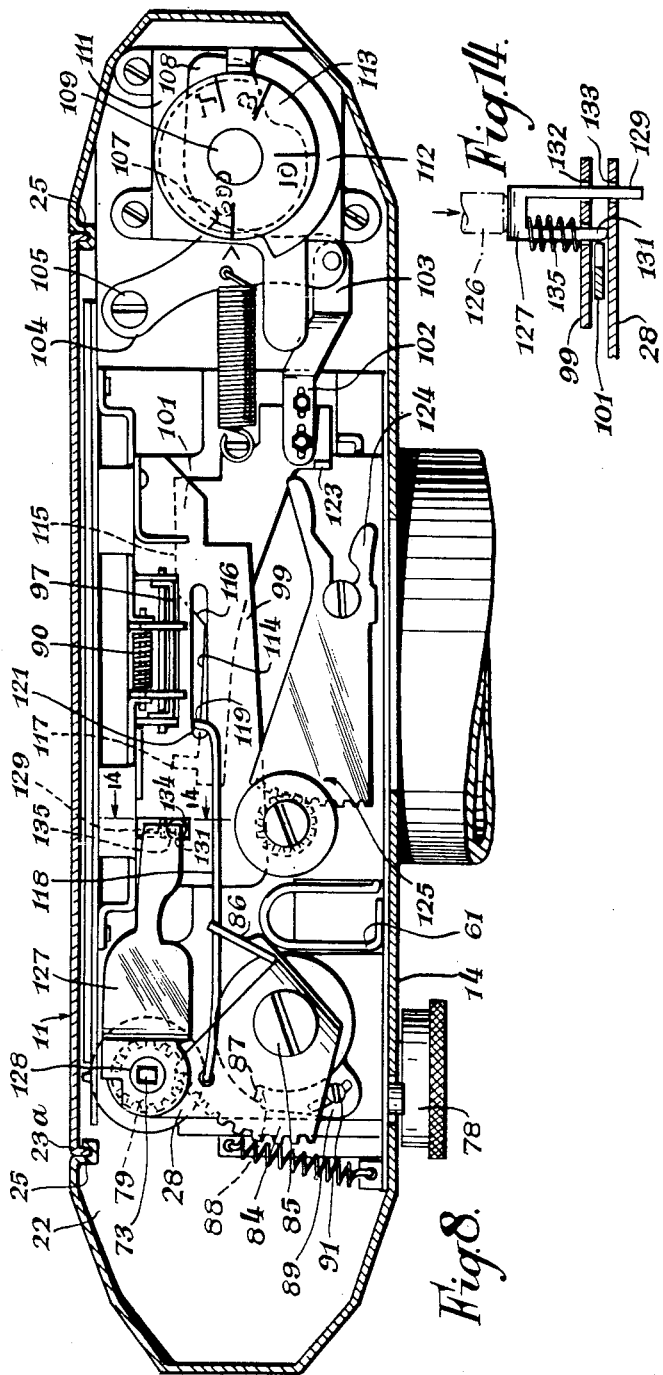

Patented Jan. 5, 1954

2,664,800

UNITED STATES PATENT OFFICE 2,664,800

PHOTOGRAPHIC CAMERA AND SHUTTER MECHANISM THEREFOR

Alfred Croger Mayo, Richmond, England

Application September 25, 1950, Serial No. 186,547
Claims priority, application Great Britain
October 5, 1949

2 Claims. (Cl. 95—55)

This invention relates to photographic cameras, and especially to shutter mechanism for such cameras.

One object of the invention is to provide a focal plane shutter using plates of rigid material and combining the simplicity of the usual plate type of shutter with the compactness of the roller blind type, and in which the overall dimensions of the shutter mechanism do not increase in proportion to the size of the exposure frame of the camera.

Another object of the invention is to produce a photographic roll film camera of compact size having a shutter system which operates over a wide range of exposure speeds, the setting of the shutter and the winding of the film being effected by a single operation and the camera being simple in construction.

According to one feature of the invention a shutter for a photographic camera comprises a plurality of relatively slidable overlapping plates movable from a telescoped position in which they lie wholly to one side of the picture gate of the camera to an extended position in which they form a blind extending wholly over the picture gate.

According to another feature of the invention a shutter system for a photographic camera comprises leading and trailing shutters which move in succession across the picture gate during an exposure, each of the said shutters comprising a group of overlapping slidable plates as set forth in the last preceding paragraph, one plate of one shutter being attached to the camera at one side of the picture gate and one plate of the other shutter being attached to the camera at the other side of the picture-gate, the two shutters being adapted to engage each other at their free edges to form a light-tight joint.

The invention is hereinafter described with reference to the accompanying drawings, in which:

Figure 1 is a front perspective view of one form of camera according to the invention;

Figure 2 is a section on the line 2—2 of Figure 1;

Figure 5 is a perspective view of the camera chassis, with some parts omitted;

Figure 6 is a detail view showing the construction of the shutter itself;

Figure 7 is a front view of the camera chassis removed from its case;

Figure 8 is a plan view of the camera chassis, showing the mechanism for setting the shutter and determining the exposure, the camera being shown in section;

Figure 9 is an end view looking from the left-hand end of Figure 6;

Figure 10:
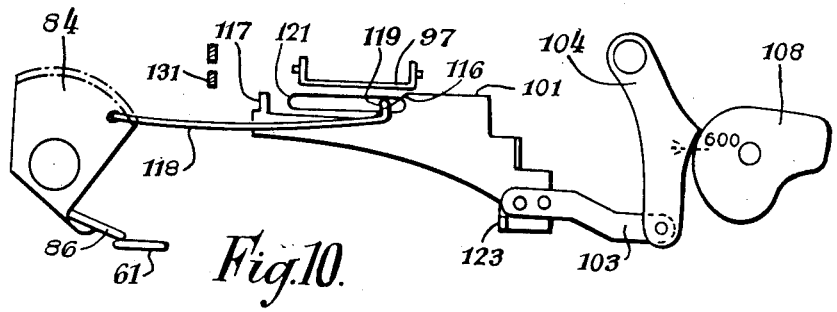
Figure 11:
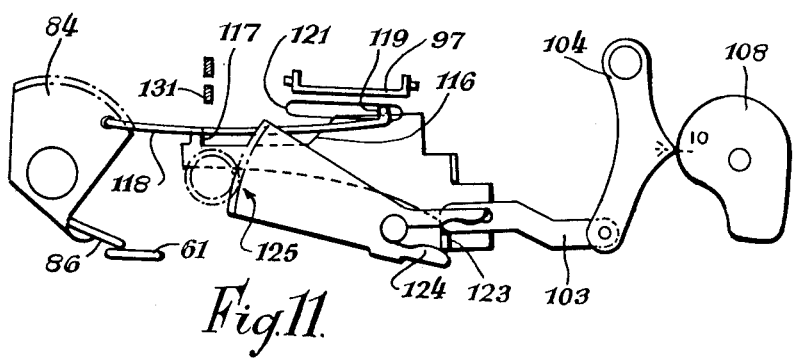
Figure 12:
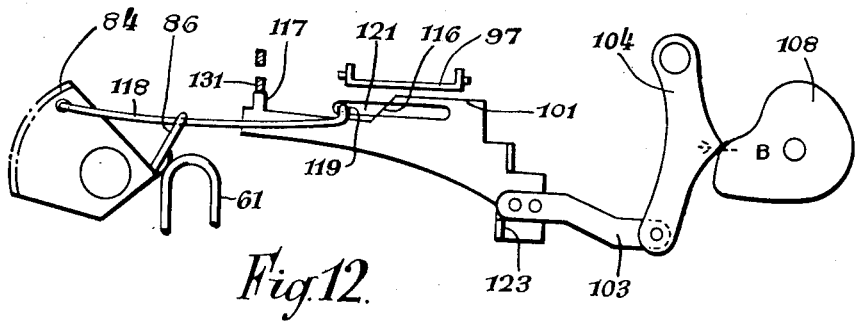
Figure 13:
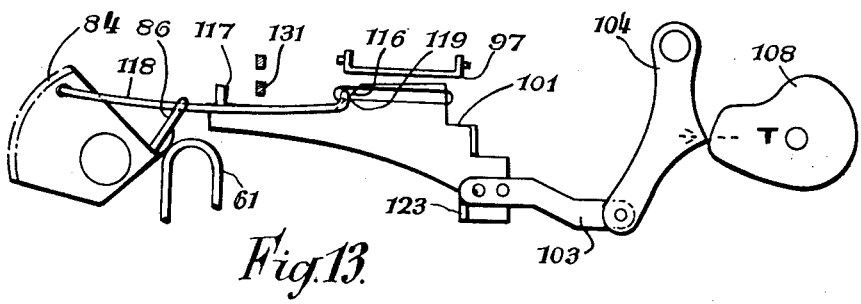

Figures 10, 11, 12 and 13 are views similar to Figure 8, showing the positions of the parts for various exposures, Figure 10 showing the camera set for a short "instantaneous" exposure, Figure 11 showing the camera set for a longer "instantaneous" exposure, Figure 12 showing the camera after the leading shutter has been released to effect a "bulb" exposure, and Figure 13 showing the camera after the leading shutter has been released to effect a "time" exposure; and Figure 14 is a section on the line 14—14 of Figure 8.

Referring to the drawings (Figures 1 and 2), the camera comprises a case formed in two parts 10 and 11, a lens unit 12 mounted in the case part 10, and a chassis 13 removably mounted in the case and carrying the shutter, shutter operating mechanism, and film winding mechanism.

The case part 10 includes a front 14 to which is secured a ring 15 to receive the lens unit 12, a top 16, and ends 17 and 18 bent round to define film compartments 19 and 21. The case part 11 includes a bottom 22, flanged to overlap the edges of the front and sides, and a back 23 closing the space between the ends 17 and 18, the back 23 having flanges 23a (Figure 8) which enter grooves 25 in the ends to provide a light-tight joint. The upper end of the back passes behind a flange 26 at the rear edge of the top.

The chassis 13 (Figures 5 and 7 to 13) comprises a die casting 27 including upper and lower plates 28 and 29, a vertical wall 31 forming the front of a shutter housing 32, and struts 33 between the front edges of the plates 28, 29; a plate 34 secured to the casting 27 by screws and forming the back of the shutter housing 32; and a front plate 35 also secured to the casting by screws, the wall 31, plate 34 and plate 35 having aligned rectangular openings, the opening 36 in the plate 34 forming the picture gate. A rectangular tube 37 (Figure 2) secured to the front plate 35 extends to the wall 31 to form a tunnel between the plate and wall.

The shutter system is located in the shutter housing and comprises two shutters 38 and 39 (Figures 2, 3, 5 and 6) each comprising three overlapping rigid, rectangular plates, the plates of the shutter 38 being shown at 41, 42 and 43, and the plates of the shutter 39 being shown at 44, 45 and 46. The plates 43 and 46 are flat, and are each provided with two projecting ears 47, one at each end, adjacent one of their side edges each of these plates having secured to its side edge remote from the ears a metal bar which projects beyond the ends of the plate. The bar on the plate 43 is indicated at 48 and the bar on the plate 46 at 49. The remaining plates 41, 42, 44 and 45 have bent-over portions 51 lying parallel to the main parts of the plates, the plates 43 and 46 lying between the main parts and the bent-over parts of the plates 42 and 45 respectively, and the plates 42 and 45 lying between the main parts and the bent-over parts of the plates 41 and 44 respectively. The plates 41, 42, 44 and 45 are provided with ears 47 similar to those on the plates 43 and 46. Each set of plates 41, 42, 43 and 44, 45, 46 are of progressively decreasing width, and the plates 41, 42 and 44, 45 are provided with lugs 52 which co-operate with the ears on the plates 42, 43 and 45, 46. Thus each set of plates is capable of telescoping and extending movement, the plates when fully telescoped being substantially completely overlapped by each other, so that their total width is substantially that of a single plate, and when fully extended having a total width somewhat less than the sum of the width of the plates. The telescoping movement is limited by each plate engaging the bend between the main and bent-over portions of the next succeeding plate, and the extension movement is limited by the ears 47 on one plate engaging the lugs 52 on the other, which engagement takes place when the plates are still overlapped to a small extent. The shutters are thus at all times light proof.

The two shutters are located between the wall 31 and the plate 34, as shown in Figure 2. The wall 31 is formed with rearwardly extending flanges 53 which are cut away at 54, and upright bars 55 are secured to the plate 34 so as to lie within the cut-away portions 54. The shutter 38, which is hereinafter called the leading shutter is positioned in the housing so that it extends upwardly from below the picture gate 36, and when telescoped lies below the picture gate, upward movement of its plate 41 being limited by the engagement of the ears 47 thereon with the lower ends of the bars 55. The shutter 39, hereinafter called the trailing shutter, is positioned in the housing so that it extends downwardly from above the picture gate, and, when telescoped, lies above the picture gate, downward movement of its plate 44 being limited by the engagement of the ears 47 thereon with the upper ends of the bars 55.

Figure 3:
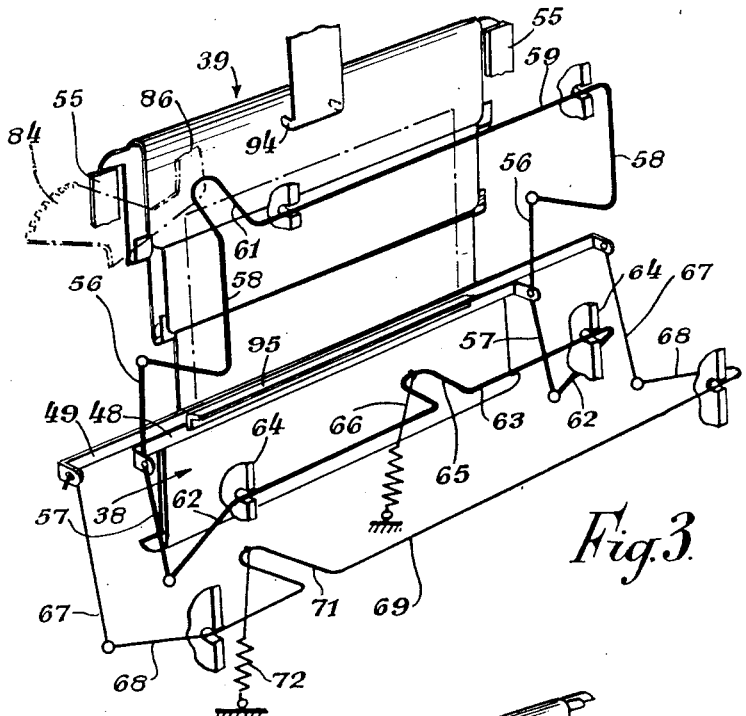
Figure 3 is a diagram showing one form of shutter mechanism according to the invention, in the position which it occupies prior to setting for making an exposure.
Figure 4:
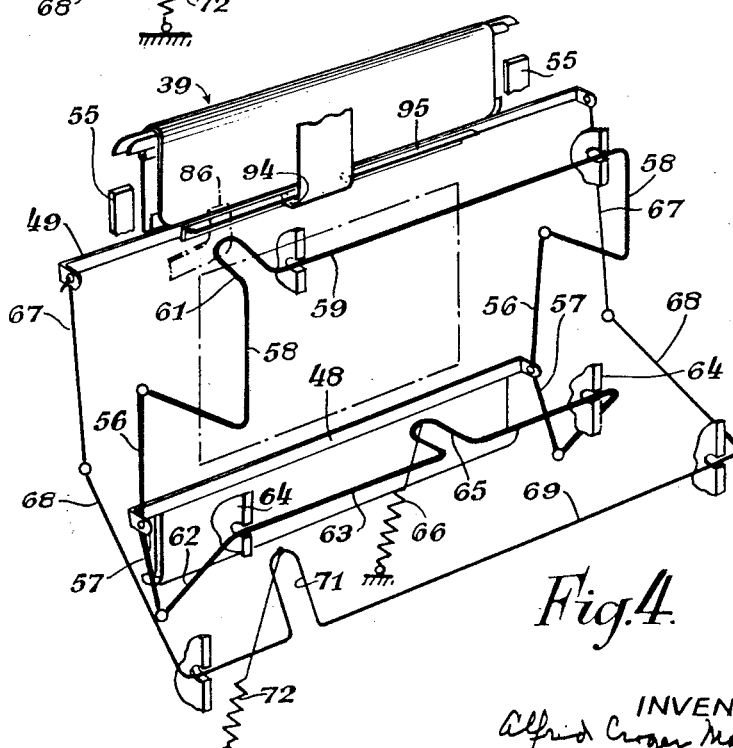
Figure 4 is a diagram similar to Figure 3, but showing the shutter mechanism in the position it occupies during a "time" or "bulb" exposure.

The ends of the bars 48 and 49 project through the cut-away portions 54 at the sides of the shutter housing, the ends of the bar 49 being longer than the ends of the bar 48, and the ends of both being bent forwardly and provided with apertures as shown. To each forwardly-bent end of the bar 48 there are connected two links 56, 57 (Figures 3 and 4) extending upwardly and downwardly respectively. The links 56 are coupled to the free ends of two L-shaped arms 58 turning with a rocking shaft 59 mounted in lugs extending downwardly from the upper plate 28, the rocking shaft 59 having also an arm 61 which projects upwardly through a notch in the plate 28. The links 57 are coupled to two straight arms 62 turning with a rocking shaft 63 journalled in lugs 64 integral with the struts 53 of the chassis, the rocking shaft 63 having also an arm 65 to which is secured one end of a tension spring 66 anchored to the lower plate 29, the spring 66 urging the rocking shaft 63 to rock about its axis in such a direction as to pull the bar 48 downwardly. Links 67 are connected to the ends of the bar 49, these links being coupled to arms 68 turning with a rocking shaft 69 journalled in the struts 53, and having an arm 71 to which is secured one end of a tension spring 72 anchored to the lower plate 29, the spring 72 urging the rocking shaft 69 to rock about its axis in such a direction as to pull the bar 49 downwardly.

The rocking shafts 59, 63 and 69 together with the arms associated with them, are each made from a length of wire bent to the desired shape.

The spring 66 thus tends to urge the leading shutter 38 to its telescoped position, and to hold the bar 48 against the lower ends of the cut-away portions 54, whilst the spring 72 tends to urge the trailing shutter 39 to its extended position and hold its lower edge in contact with the upper edge of the leading shutter, so that the trailing shutter covers the picture gate.

The impact at the completion of the movement of the shutters for making an exposure is thus taken by the bars 48 and 49, and not by the shutter plates themselves, so that the said plates can be very thin and light.

Between the upper and lower plates 28 and 29 of the chassis, beyond one edge of the back plate 34, there is journalled a shaft 73 (Figure 9) having fixed to it two toothed wheels 74 adapted to engage the perforations of a cine-film, the shaft 73 carrying a crown wheel 75 meshing with a pinion 76 on a shaft 77 which projects forwardly from the chassis and passes through the front 14 of the case to receive an operating knob 78. The shaft 73 projects upwardly through the upper plate 28, its projecting portion being square in cross section and having mounted on it for sliding movement a pinion 79 having a square hole, the pinion having a boss 81 which projects upwardly through a lug 82, and the pinion being urged upwardly against the lug by a spring 83. A toothed sector 84 (Figures 8 to 13) is mounted on a pivot 85 on the upper plate 28, the teeth on the sector meshing with the pinion 79 when the latter is in its upper position, but being disengaged by pushing the pinion downwardly. An arm 86 (Figures 8 and 10 to 13) formed integral with the sector 84 engages the arm 61, and, as the sector is rotated in a clockwise direction, moves the arm 61 to rock the rocking shaft 59 and so extend the leading shutter, thus also telescoping the trailing shutter, until the former covers the picture gate and the latter lies wholly above the said gate. The sector 84 carries a stop 87 co-operating with a stop 88 on an angularly adjustable stop plate 89 to limit the angular movement of the sector and thus determine the set position of the shutters. The stop plate 89 is adjustable about the pivot 85, and is locked in any position to which it is adjusted by a set screw 91 passing through a slot in the said plate and screwing into a hole in the upper plate 28. The leading shutter is held in the set position solely by the friction in the mechanism by which it is set and by the resistance to movement of the film, but a catch is provided to hold the trailing shutter. This catch comprises a catch arm 92

(Figure 2) pivotally mounted at 93 on the wall 31 and having a nose 94 which is urged by a torsion spring 90 to engage below a flange 95 on the lower edge of the trailing shutter 39, the catch arm 92 having a pair of fingers 96 co-operating with the upper edge of a plate 97 pivotally mounted at 98 on the wall 31, the pivot of the plate 97 being parallel to that of the catch arm 92, and being below the upper edge of the plate. Slidably mounted between the upper plate 28 and a guide plate 99 is a striker 101 (Figures 8 and 10 to 13) comprising a flat strip of metal adjustably secured at 102 to a link 103 pivoted to one end of an arm 104 which is pivoted at its other end on the upper plate 28 at 105, a tension spring 106 mounted between the striker 101 and the arm 104 tending both to rock the striker 101 backwardly towards the rear of the camera, and to urge the arm 104 in a clockwise direction about the pivot 105. The arm 104 engages at 107 with a cam 108 mounted on a shaft 109 journalled in the upper plate 28 and in a cover plate 111 secured thereto, a stop disc 112 on the shaft limiting the movement of the cam to 180°. The shaft 109 projects through the top of the case to receive an operating knob 113. The cam 108 is so formed that at one limit of its movement the striker is at one end of its movement, and rotation of the cam through 90° moves the striker continuously towards the other end of its movement, further movement of the cam causing the striker first to return some distance towards its initial position, and finally to move to an extreme position beyond that which it occupies at the end of the first 90° of movement of the knob. The rear edge of the striker 101 constitutes a cam edge comprising two straight portions 114 and 115 joined by a ramp 116, a finger 117 being provided on the straight portion 114.

A rod 118 is pivotally attached to the toothed sector 84 at a point offset from the pivot of the sector, the rod 118 having a projection 119 which passes downwardly through slots 121 and 122 in the guide plate 99 and the upper plate 28 of the chassis, and passes, between these plates, across the rear edge of the striker 101. Thus, when the projection is opposite the part 115 of the rear edge of the striker the latter is held back away from the plate 97, but when the projection rides down the ramp 116 on to the portion 114 the striker is urged rearwardly by the spring 106 to bring it into engagement with the plate 97 and so release the trailing shutter. As the projection 119 makes the same movement each time the shutter system is released, the interval between the release of the leading shutter and the release of the trailing shutter depends on the position of the striker, which determines the length of travel of the leading shutter before the trailing shutter is released. The rod 118 and projection 119 form a retaining member for keeping the striker 101 in what may be termed the "cocked" position.

The striker 101 carries an upward projection 123 which, in certain positions of the striker engages, as the striker is released to release the trailing shutter, the arm 124 of an inertia delay device 125.

The release of the shutter system is effected by a release button 126 (Figure 1) acting on the flat upper surface of a member 127 (Figure 8) one end of which is apertured at 128 to pass over the end of the shaft 73 and bear on the boss 81 of the pinion 79, its other end having two downwardly-projecting fingers 129 and 131. The finger 129 is a guide finger and passes through aligned holes 132 and 133 in the guide plate 99 and the upper plate 28 of the chassis, the finger 131 passing down through a hole 134 in the guide plate 99 only. A spring 135 mounted on the finger 131 normally holds the end of that finger clear of the upper plate 28 of the chassis. At one position of the striker 101, the finger 117 thereon is opposite the finger 131 on the member 127 and thus, with the striker in that position, when, the leading shutter is released by pressing down that member to disengage the pinion 79 from the toothed sector 84, the finger 131 is pressed down into the path of the finger 117, and the striker is prevented from operating to release the trailing shutter until the member 127 is released, thus providing for "bulb" exposures.

A counter 136 (Figures 1 and 7) is driven off the shaft 73 to indicate how many exposures have been made.

The operating knob 113 is marked with exposure speeds from the maximum, for example 1/600 of a second to 1/10 of a second, the markings extending over a range of 90° and co-operating with an index 137 on the case. A further marking indicating the position of the parts for "bulb" exposures is provided about 45° beyond, the slow speed end of the "instantaneous" range, and a "time" exposure position is provided at a point 180° from the maximum speed marking. It will be apparent that the striker 101 will also be set to the "bulb" position at the centre of the "instantaneous" range, and the marked speeds are selected so as to avoid this position.

The shutter mechanism is rendered self-capping by providing an angle strip extending along the lower edge of the plate 46 of the shutter 39, one flange 138 of the angle strip projecting below the edge of the plate 46 so as to overlap the plate 43 of the shutter 38. The other flange of the angle strip constitutes the flange 95.

When making an exposure with the camera described, the knob 78 is rotated to set the shutters and move the film, the knob 113 being set, either before or after the setting of the shutters, to the desired speed. The rotation of the knob 78 causes the projection 119 of the retaining member to move along the rear edge of the striker 101 and ride up the ramp 116 on to the portion 115 of the said edge, thus rocking the striker forwardly. The catch arm 92 engages automatically with the flange 95 on the trailing shutter 39 when the shutters reach the set position, under the influence of the spring 90.

Figure 10 shows the position of the parts when the shutter mechanism is set and is adjusted for the highest available speed. The striker 101 is drawn as far as possible to the right, so that only the end of the part 115 of its rear edge closest to the ramp 116 is opposite the plate 97, and the projection 119 of the retaining member is in engagement with the end of the ramp 116 nearest to the part 115 of the said edge, so that the striker is rocked forwardly against the resistance of the spring 106. When the pinion 79 is pressed downwardly by the button 126, acting through the member 127, the toothed sector 84, as soon as it commences to move, pulls the projection 119 clear of the ramp, and the striker swings rearwardly almost at once to strike the plate 97 and release the trailing shutter. The trailing shutter thus follows the leading shutter with very little delay, and the shutters travel across the picture gate with only a narrow slot between them. The projection 123 on the striker is, in this case, positioned beyond the end of the arm 124 of the inertia delay device, so the latter does not come into operation.

Figure 11 is a view similar to Figure 10, but showing the shutter mechanism adjusted for a slower "instantaneous" speed, for example one tenth of a second. As will be seen, the cam 108 has been turned by the knob 113 to rock the arm 104 in a clockwise direction, and this has displaced the striker 101 to the left, so that the projection 119 engages the edge 115 thereof at a point spaced some distance from the ramp 116. Moreover, the projection 123 on the striker is in a position to engage the arm 124 of the inertia delay device. Thus, when the release button 126 is operated, and the toothed sector 84 moves under the influence of the spring 66 acting on the leading shutter, the projection 119 does not reach the ramp 116 until the sector 84 has moved some considerable distance, and the leading shutter 38 has exposed a substantial part of the picture gate. When the projection 119 does reach the ramp 116 the striker 101 commences to move, but its movement is delayed by the inertia delay device 125, and thus the trailing shutter does not move until a substantial interval has elapsed.

Figure 12 is again similar to Figures 10 and 11, but shows the shutter mechanism after release of the leading shutter during a "bulb" exposure. The arm 104 has been turned somewhat anti-clockwise from its position in Figure 11 so that the finger 131 on the member 127 lies, when the member 127 is depressed, in the path taken by the finger 117 on the striker when the latter is released by the projection 119. Thus, when the release button 126 is depressed, and the leading shutter 38 is released, the striker 101 is, as shown in the drawing, prevented from completing its movement due to the finger 117 engaging the finger 131, and the trailing shutter 39 is not released until the release button 126 is allowed to rise to its normal position.

Figure 13 shows the position of the parts during a "time" exposure, when the leading shutter 38 has been released and the trailing shutter 39 is still latched in its set position. As will be seen, the arm 104 is turned somewhat clockwise from its position in Figure 10, and the striker 101 has moved so far to the left that when the toothed sector 84 has been released and has returned fully to its initial position, the projection 119 is still opposite the ramp 116, and the striker is not able to engage the plate 97. The trailing shutter is released to terminate the exposure by turning the knob 113 to move the striker 101 relative to the projection 119, so that the projection 119 rides down the ramp and allows the striker to strike the plate 97.

It will be understood that the details of the mechanism of the camera may be varied without departing from the scope of the invention. The shutters may be greatly simplified if a separate capping shutter is used, the leading and trailing shutters then taking the form of sets of simple flat plates, linked together in any suitable manner, and having no overlap at the meeting edges of the two shutters.

I claim:
1. Shutter operating mechanism for a roll film camera comprising leading and trailing shutters which move in succession across a picture gate during an exposure, spring means acting on said leading shutter and separate spring means acting on said trailing shutter to effect the movement of the said shutters during an exposure, a rocking shaft, a pair of arms fixed to said rocking shaft, link means connecting said arms to the leading shutter, a third arm on said rocking shaft, a shutter setting arm mounted for angular movement and co-operating with said third arm to rotate the rocking shaft and move the leading shutter to a set position in which it covers the picture gate, means on said leading shutter to engage the trailing shutter and move it with the leading shutter during the setting movement, a toothed sector mounted to move as one with said shutter setting arm, an axially slidable pinion meshing with said toothed sector, means to rotate said axially slidable pinion, means frictionally restraining rotation of said axially slidable pinion, a rod pivotally connected to said toothed sector at a point offset from the pivot thereof, a lateral projection on said rod, guide means constraining said lateral projection to move in a rectilinear path, means to displace the axially slidable pinion and thereby release the toothed sector and leading shutter and move the lateral projection along its rectilinear path, a catch to retain the trailing shutter in the set position, a striker, spring means urging said striker in a direction to release said catch, a cam edge on said striker engaged by said lateral projection, said cam edge being so shaped that when the shutters are set the striker is held clear of the catch by the lateral projection and is released to free the catch when the lateral projection reaches a predetermined point thereon, and means for effecting substantially linear movement of the striker in the direction of movement of the lateral projection to vary the point in the stroke of the latter at which the striker is released.

2. Shutter operating mechanism as set forth in claim 1 wherein the means for effecting linear movement of the striker comprise a pivotally mounted lever extending in a direction substantially perpendicular to the direction of linear movement of the striker, spring means interposed between the lever and the striker and acting to urge the striker in one direction, and cam means engaging the lever to move the striker in the opposite direction.

ALFRED CROGER MAYO.

References Cited in the file of this patent

UNITED STATES PATENTS

| Number | Name | Date |
|---|---|---|
| 2,122,671 | Leitz et al. | July 5, 1938 |
| 2,173,991 | Albert | Sept. 26, 1939 |
| 2,222,041 | Moomaw | Nov. 19, 1940 |
| 2,275,807 | Philips | Mar. 10, 1942 |
| 2,347,951 | Hunter | May 2, 1944 |
| 2,358,061 | Drotning | Sept. 12, 1944 |
| 2,526,432 | Svensson | Oct. 17, 1950 |

FOREIGN PATENTS

| Number | Country | Date |
|---|---|---|
| 822,401 | France | Sept. 20, 1937 |
| 478,710 | Great Britain | Jan. 24, 1938 |